(12) United States Patent
Colley et al.

(10) Patent No.: US 9,098,126 B2
(45) Date of Patent: Aug. 4, 2015

(54) USER INTERFACE

(75) Inventors: Ashley Colley, Oulu (FI); Juha Kosonen, Porvoo (FI)

(73) Assignee: Nokia Technologies Oy, Espoo (FI)

( * ) Notice: Subject to any disclaimer, the term of this patent is extended or adjusted under 35 U.S.C. 154(b) by 852 days.

(21) Appl. No.: 13/279,419

(22) Filed: Oct. 24, 2011

(65) Prior Publication Data

US 2013/0102361 A1    Apr. 25, 2013

(51) Int. Cl.
*H04B 1/38*    (2006.01)
*G06F 3/033*    (2013.01)
*H04M 1/60*    (2006.01)

(52) U.S. Cl.
CPC .............. *G06F 3/033* (2013.01); *H04M 1/6058* (2013.01)

(58) Field of Classification Search
CPC ........................................................ H04B 1/38
USPC .......... 455/557, 575.2, 569.1, 418, 566, 556.1
See application file for complete search history.

(56) References Cited

U.S. PATENT DOCUMENTS

| | | | |
|---|---|---|---|
| 7,953,231 B2 | 5/2011 | Ishida | |
| 8,625,836 B2 * | 1/2014 | Aase et al. | 381/384 |
| 2004/0146254 A1 * | 7/2004 | Morrison | 385/100 |
| 2005/0175210 A1 | 8/2005 | Yang | |
| 2007/0131445 A1 | 6/2007 | Gustavsson | |
| 2007/0237170 A1 | 10/2007 | Proctor et al. | |
| 2008/0165986 A1 * | 7/2008 | Daniels et al. | 381/109 |
| 2009/0257604 A1 | 10/2009 | Yeates | |
| 2011/0316611 A1 * | 12/2011 | Gustavsson | 327/516 |

FOREIGN PATENT DOCUMENTS

| | | |
|---|---|---|
| CA | 2702216 | 7/2010 |
| CN | 201185469 | 1/2009 |
| KR | 100736244 | 6/2007 |
| WO | WO2007120413 | 10/2007 |

OTHER PUBLICATIONS

International Search Report for International Application No. PCT/FI2012/050915—Date of Completion of Search: Mar. 7, 2013, 5 pages.
Li, Q. et al., "Multi-channel technology based animated interaction in E-paper device", IEEE Research Paper, Publication Date: Apr. 16-18, 2011, pp. 4194-4198.

* cited by examiner

*Primary Examiner* — Michael T Vu
(74) *Attorney, Agent, or Firm* — Locke Lord LLP

(57) ABSTRACT

A method comprising in which electricity and/or information signals is/are passed between an accessory device or power supply and an apparatus through a cable comprising one or more electric or optical wires. Mechanical manipulation of the cable by a user is detected. Responsive to detecting of manipulation of the cable, controlling operation is caused in an apparatus that is in operational connection with the cable to enable the user to control the apparatus by manipulation of the cable.

20 Claims, 2 Drawing Sheets

USER INTERFACE

TECHNICAL FIELD

The present application generally relates to a user interface.

BACKGROUND

Various user devices such as mobile phones have a user interface. Typical mobile phones have a plurality of keys and/or a touch screen for receiving user input. Hands-free sets are provided for listening to music with mobile phones and for convenient telephone conversations. Hands-free sets designed for mobile phones typically have one or more keys for answering phone calls, adjusting volume, play/pause, for instance. In wired hands-free sets, there is a cable that connects headphones and a microphone to the mobile phone and that has housing for the keys usually near the neck of the user when in use.

Some wireless headsets have a radio transceiver in a housing that contains a microphone, a headphone and a support for holding the headphone in place. The housing of such headsets typically has one or more keys as user controls. There are also some wired hands-free sets where user controls are located at one or two headphones.

SUMMARY

Various aspects of examples of the invention are set out in the claims.

According to a first example aspect of the present invention, there is provided a method comprising:

detecting mechanical manipulation of a cable by a user; and responsive to the detecting of the mechanical manipulation of the cable, causing controlling operation of an apparatus that is in operational connection with the cable to enable the user to control the apparatus by mechanical manipulation of the cable.

The mechanical manipulation may comprise bending the cable.

The mechanical manipulation may comprise squeezing the cable.

The mechanical manipulation may comprise bending and squeezing the cable.

The method may comprise detecting extent of the mechanical manipulation of the cable.

The method may comprise producing a control signal indicative of a user command in response to the detecting of the mechanical manipulation of the cable.

The method may further comprise detecting location of the mechanical manipulation of the cable. The location may be detected along the length of the cable.

The control signal may further be indicative of the detected location of the mechanical manipulation of the cable.

The method may further comprise passing electricity and/or information signals through the cable.

The cable may comprise one or more electric or optical wires.

The cable may be configured to connect an accessory device with the apparatus.

The cable may be configured to connect the apparatus with a power supply.

The cable may be configured to connect the apparatus with a power consuming device.

The detection of the mechanical manipulation may be configured operable with prior-existing cables by detecting changes in one or more properties of the cable. The detection of the mechanical manipulation may be based on spread-spectrum time-domain reflectometry. Alternatively, or additionally, the detection of the mechanical manipulation may be based on optical time-domain reflectometry.

The detection of the mechanical manipulation may be based on receiving response signals from a mechanical manipulation sensitive element comprised by the cable. The mechanical manipulation sensitive element may extend over entire length of the cable or over a portion of the length of the cable.

In some implementations it could be that some parts along the length of the mechanical manipulation sensitive element are manufactured to be more bend-sensitive than other parts of the wire.

The method may further comprise providing illumination by a given proportion of the length of the cable. The given proportion may be greater than 50 and up to 100% of the length of the cable.

The providing of the illumination may comprise providing illumination with variable colors.

The variable colors may be temporally variable. The variable colors may be alternatively or additionally spatially variable.

The providing of the illumination may be configured to produce one or more visually different parts in the cable along the length thereof corresponding to different functions available to the user by mechanical manipulation of the cable.

The providing of the illumination may be configured to provide feedback on detecting mechanical manipulation of the cable. The feedback may comprise illumination with one or more breaks; illumination with a given color, combination or sequence of colors; and/or illumination or stopping of illumination at given one of the parts.

Alternatively or additionally, the illumination may provide feedback with any one or more of the following visual effects or changes in a visual effect:

changing length of an effect;
changing location of an effect;
an effect being produced in two or more locations that change with respect to each other (approach or distance); and
changing the effect itself (blinking, color change, brightness change, gradient change in color and/or brightness).

The providing of the illumination may employ an optical wire. One or more changes in properties of the optical wire used for the providing of the illumination may also be used for the detecting of the mechanical manipulation of the cable.

The temporal varying of the colors may be synchronized to signals that pass through the cable. The temporal varying of the colors may be configured to form a visual illustration of an audio signal that is passed through the cable. The visual illustration may serve others as an indication of the user being occupied by a phone call, when the cable interconnects headphones and a telecommunication device.

The varying of the colors may be performed according to a state of one or more services or applications of the apparatus.

The method may further comprise producing a haptic feedback. The haptic feedback may be provided by the apparatus. Alternatively or additionally, the haptic feedback may be provided by the cable. Further alternatively or additionally, the haptic feedback may be provided by one or more headphones connected to the cable.

The method may further comprise producing an audible feedback. The audible feedback may be provided by the apparatus. Further alternatively or additionally, the audible feedback may be provided by one or more headphones connected to the cable.

The method may further comprise performing capacitive touch sensing to inhibit producing of the control signals when the bending of the cable is not caused by the user's skin.

According to a second example aspect of the present invention, there is provided an apparatus comprising:
at least one memory comprising instructions;
at least one processor configured to control operations of the apparatus according to said instructions;
a detector circuitry; and
a port configured to operatively connect a cable to the detector circuitry;
wherein the detector circuitry is configured to detect mechanical manipulation of the cable by a user; and
the processor being further configured, responsive to the detecting of the mechanical manipulation of the cable, to cause controlling operation of the apparatus to enable the user to control the apparatus by mechanical manipulation of the cable.

The cable may comprise one or more electric or optical wires and the cable port may be configured to operatively connect the one or more electric or optical wires a to the detector circuitry and to exchange electricity and/or information signals through the cable.

According to a third example aspect of the present invention, there is provided an apparatus comprising:
at least one memory comprising instructions;
at least one processor configured to control operations of the apparatus according to said instructions;
a detector circuitry;
a cable port configured to operatively connect a cable to the detector circuitry; and
a host device port configured to operatively connect the apparatus to a host device for exchanging power or information signals between the cable and the host device;
wherein the detector circuitry is configured to detect mechanical manipulation of the cable by a user; and
the processor is further configured, responsive to the detecting of the mechanical manipulation of the cable, to produce corresponding control signals and to output the control signals by the host device port to enable the user to control the host device by mechanical manipulation of the cable.

According to a fourth example aspect of the present invention, there is provided a computer program comprising computer executable program code which when executed by an apparatus causes the apparatus to perform:
passing electricity and/or information signals through a cable comprising one or more electric or optical wires;
detecting mechanical manipulation of the cable by a user; and
responsive to detecting of mechanical manipulation of the cable, causing controlling operation of an apparatus that is in operational connection with the cable to enable the user to control the apparatus by mechanical manipulation of the cable.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
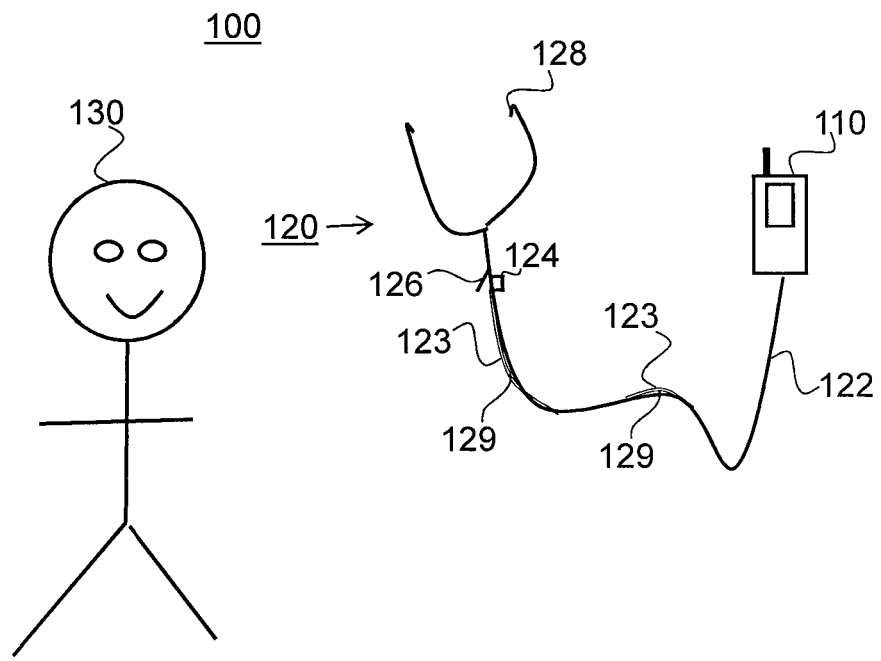
FIG. 1 shows a block diagram of a system illustrating an example embodiment of the invention.

FIG. 1 shows a block diagram of a system 100 illustrating an example embodiment of the invention. The system 100 comprises a communication device 110 such as a mobile phone, personal digital assistant or a web tablet; and a hands-free set 120 comprising a cable 122, a microphone 124, a clip 126 and headphones 128. A user 130 wearing the hands-free set 120 (or headset in short) is also drawn. The hands-free set of this embodiment differs from prior existing ones in that there is provided a light guide or a leaking optical wire 129 that extends from the communication device 110 to a manipulation section 123 on the cable 122. The manipulation section 123 refers to a part of the cable 122 that is intended to be mechanically manipulated by the user 130 for controlling the communication device 110. The manipulation section 123 may extend from a connector (420 in FIG. 4) up to the microphone 124, for example. Alternatively, the manipulation section 123 may not extend all the way to the connector. In this case, the optical wire 129 may run inside the cable out of sight and be visible only in the manipulation section 123. To this end, the optical wire 129 may run on the surface of the cable 122 only over the manipulation section 123, or the cable 122 may have a cover (410 in FIG. 4) that is transparent only over the manipulation section 123. It is also possible to contain more than one optical wires 129 each visible over the manipulation section 123 or over the whole length of the cable 122. In another example embodiment, there are more than one manipulation sections 123. In this example embodiment, different optical wires 129 may be arranged visible on different manipulation sections 123 so as to producing different visual effects in different parts of the cable 122 as will be described with more detail in the following with reference to FIG. 3.

It helps understanding of some example embodiments to consider that the cable 122 is at simplest a prior existing hands-free set 120 with a cable having at least electric wires to communicate audio signals. The cable 122 may also have an ability to show different visual effects on one or more sections thereof. These sections may be referred to as manipulation sections 123. Alternatively, there may be more sections or less sections capable of showing different visual sections than there are manipulation sections 123.

Figure 2:
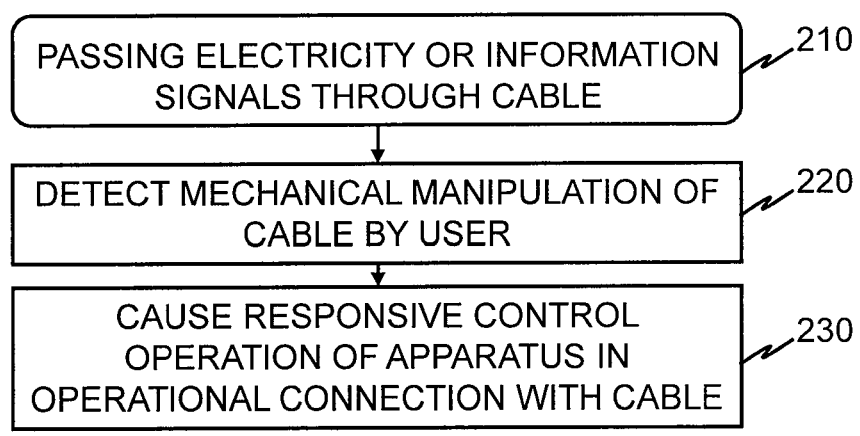
FIG. 2 shows a flow chart of a process according to an example embodiment.

FIG. 2 shows a flow chart of a process according to an example embodiment. The process comprises:

passing 210 electricity and/or information signals through a cable 122 comprising one or more electric or optical wires 129;

detecting 220 mechanical manipulation of the cable 122 by a user 130; and responsive to the detecting of the mechanical manipulation of the cable 122, causing controlling operation 230 of an apparatus 110 that is in operational connection with the cable 122 to enable the user 130 to control the apparatus by mechanical manipulation of the cable 122.

The mechanical manipulation may comprise bending the cable 122. For example, the user 130 may bend the cable 122 at given positions along the length of the cable 122 to signal specific functions to the apparatus 110 (or, in other words, host device). In one example embodiment, additionally gestures are assigned to further controlling acts or events. For instance, such additional gestures can be dragging a bend along the cable 122 (e.g. by pulling cable 122 between finger and thumb to create a bend that moves along the cable 122).

In one example embodiment, the process further comprises detecting multiple simultaneous mechanical manipulations of the cable 122. For instance, multi-bend interactions can be detected.

In one example embodiment, the detection of the mechanical manipulation 220 also comprises detecting whether a given succession of mechanical manipulations of the cable 122 has occurred.

In one example embodiment, the amount or extent of mechanical manipulation such as bending in the cable 122 is detected. This amount can be used as an interaction parameter such as volume control. The amount can be measured as total angle of bending, curvature radius, speed of change of the angle or curvature of the bending or generally changing speed of the mechanical manipulation 220.

In the foregoing, bending has been disclosed as one example of the mechanical manipulation 220. In some example embodiments, squeezing of the cable 122 is used instead or in addition to the bending as the mechanical manipulation. The squeezing can be detected, for example, by containing at least in the manipulation sections 123 a sensing cable that is a coaxial cable with squeezable dielectric insulator. When the sensing cable is squeezed, the dielectric insulator deforms and modifies the electrical characteristics of the cable such that detection of the mechanical manipulation is possible.

The detecting 220 of the mechanical manipulation involves, in one example embodiment, detecting the location of the mechanical manipulation of the cable 122 in relation to the length of the cable 122. In response, a control signal can be produced indicative of the detected location of the mechanical manipulation of the cable 122. In one example embodiment, the mechanical manipulation 220 is detected in a two-phase process in which a first mechanical manipulation event is detected and a second mechanical manipulation event is detected. The difference of the first and second mechanical manipulation events can be used as a confirmation for detection of the mechanical manipulation 220 and/or to determine the amount or extent of desired effect. For instance:

An initial bend of the cable at position x activates a detection mode such that position x is considered as a center point for following interactions. The distance of subsequent bends within a given time interval from the center point is used as corresponds to scale or extent of desired effect, e.g. so that the larger the distance the greater the extent. The center point may also be visually highlighted.

Multiple simultaneous bends—a first bend is held whilst a second bend is made. Multiple bend can be used to indicate another function that a single bend. For instance, multiple bend may cause a mute command, play or pause command, start a phone call process, answer to an incoming phone call, silence a ringer of a phone on incoming call, or start recording of a voice note.

Moving the bending along the cable is used as an interaction.

For example, a static bend sets the apparatus to volume adjust mode then dragging the bend along the cable increases or decreases the current volume level depending on the direction and distance of the drag relative to the initial bend point.

In one example embodiment, the detection of the mechanical manipulation 220 is operable with prior-existing cables 122 by detecting changes in one or more properties of the cable. Some techniques for such detection of the mechanical manipulation comprise spread-spectrum time-domain reflectometry usable at least with electric wires and optical time-domain reflectometry usable at least with optical wires 129.

In one example embodiment, the detection of the mechanical manipulation 220 is based on receiving response signals from a mechanical manipulation sensitive element comprised by the cable 122. The mechanical manipulation sensitive element may extend over entire length of the cable 122 or over a portion of the length of the cable 122. The mechanical manipulation sensitive element can be operable only at manipulation section(s) 123. Alternatively, the mechanical manipulation sensitive element is configured, in one example embodiment, to be more sensitive than at other parts of the wire.

In one example embodiment, the method further comprises providing illumination by a given proportion of the length of the cable. The given proportion is, for instance 20 to 90% or greater than 30% or greater than 50%.

There are various further embodiments concerning how the illumination is provided. For instance:

The illumination is performed with variable colors.

The illumination is performed with temporally variable colors.

The variable colors are spatially variable.

The illumination produces one or more visually different parts in the cable along the length thereof corresponding to different functions available to the user by mechanical manipulation of the cable.

The different functions may involve any one or more of: answering to an incoming call, rejecting an incoming call, starting a music player, selecting next song, starting volume control mode, increasing volume, decreasing volume, muting sound, starting entering of a voice command, starting a phone call process, recording a spoken note, The illumination provides feedback of detection of mechanical manipulation of the cable 122.

After an initial bend or multiple bend of the cable 122 at position x, possible next interactive areas are visually indicated at given positions in the cable. A default action may be associated to the position x at which the initial bend was made so as to accelerate access to the default action. For instance, a red illuminated area may indicate a possibility for negative control command and a green illuminated area may indicate a possibility for positive control command.

The feedback comprises non-continuous illumination with one or more breaks.

The feedback comprises illumination with a given color.

The feedback comprises a combination or sequence of colors.

The feedback comprises illumination or stopping of illumination at given one of the parts in the cable.

The illumination employs an optical wire.

One or more changes in properties of the optical wire used for the providing of the illumination is also be used for the detecting of the mechanical manipulation of the cable.

The temporal varying of the colors is synchronized to changes in signals that pass through the cable.

The signal that passes through the cable is an audio signal for the headphones.

The synchronizing is performed based on spectral analysis of the signals.

The temporal varying of the colors forms a visual illustration of a signal that is passed through the cable.

The visual illustration serves others as an indication of the user being occupied by a phone call, when the cable interconnects headphones and a telecommunication device.

The user is allowed to associate different visual effects produced by the illumination with different callers so that the user can distinguish a particular caller based on the visual effects produced by the cable.

The varying of the colors is performed according to a state of one or more services or applications of the apparatus, such as presence status of an instant messaging application or profile of the apparatus.

In one example embodiment, the illumination provides feedback with any one or more of the following visual effects or changes in a visual effect:
  changing length of an effect;
  changing location of an effect;
  an effect being produced in two or more locations that change with respect to each other (approach or distance); and
  changing the effect itself (blinking, color change, brightness change, gradient change in color and/or brightness).

In addition to or in alternative to providing visual feedback, audible and/or haptic feedback may be provided. For instance, the apparatus itself may vibrate, make sounds, the apparatus may provide audible feedback through the headphones 128, and/or the headphones or the cable 122 may comprise a haptic feedback element. The haptic feedback element may comprise, for instance, a vibrator or electrostatic feedback generator such as an electrostatic force signal generator configured to produce a feel of haptic texture.

In one example embodiment, capacitive touch sensing is performed to inhibit producing of the control signals when the bending of the cable is not caused by the user's skin. That is, the forming of the control signal or causing of performing of the control operation of the apparatus is subject to the presence of capacitive touch detection. The control operation is caused in one example embodiment by sending the control signal to a control processor of the apparatus.

Figure 3:
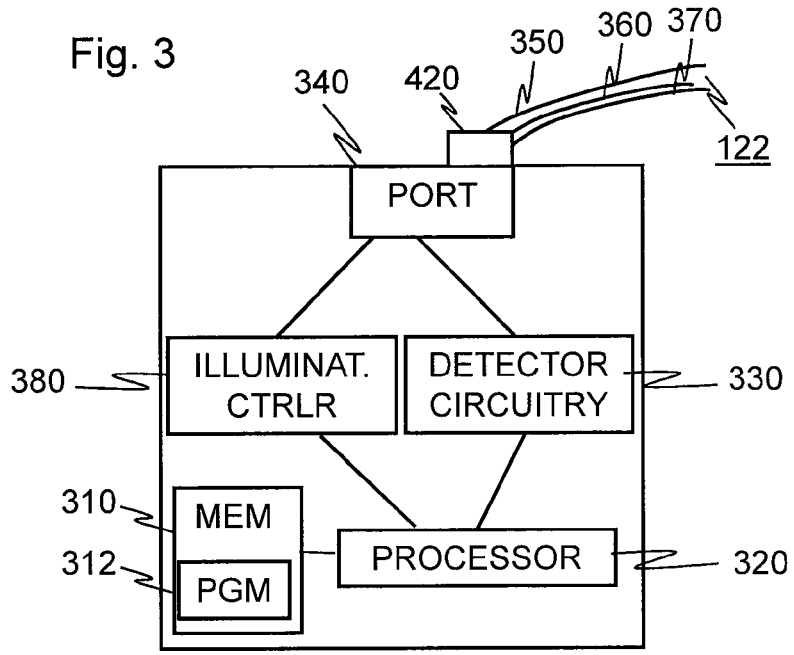
FIG. 3 shows a block diagram of a communication device and details of a hands-free set connectable to the communication device, according to an example embodiment.

FIG. 3 shows a block diagram of the communication device 110, or "apparatus" in brief to facilitate discussion of FIG. 3. FIG. 3 further shows details of the hands-free set 120. The apparatus comprises:

one or more memories 310 comprising instructions 312;
one or more processors 320 configured to control operations of the apparatus according to said instructions;
a detector circuitry 330;
a port 340 configured to operatively connect the cable 122 comprising one or more electric wires 350 or optical wires 360 to the detector circuitry 330 and to exchange electricity and/or information signals through the cable 122. In this example embodiment, the cable 122 also comprises one or more signaling or power supply wires 370. For connecting the cable 122 to the port 340, the cable 122 further comprises a connector 420.

The detector circuitry 330 is configured to detect mechanical manipulation of the cable 122 by the user 130; and the processor is further configured, responsive to detecting of mechanical manipulation of the cable, to cause controlling operation of the apparatus to enable the user 130 to control the apparatus 110 by mechanical manipulation of the cable 122.

The apparatus comprises, in one example embodiment, also an illumination controller 380 configured to operate illumination by illumination elements carried by the cable 122. If the visual effects are produced by one or more optical wires 360, the illumination controller 380 comprises necessary processing circuitries and the apparatus further comprises light sources to feed desired illumination colors and intensities to the one or more optical wires 360. On the other hand, if the visual effects are produced by local electric components, the illumination controller 380 can be constructed to feed necessary currents through the connector.

Figure 4:
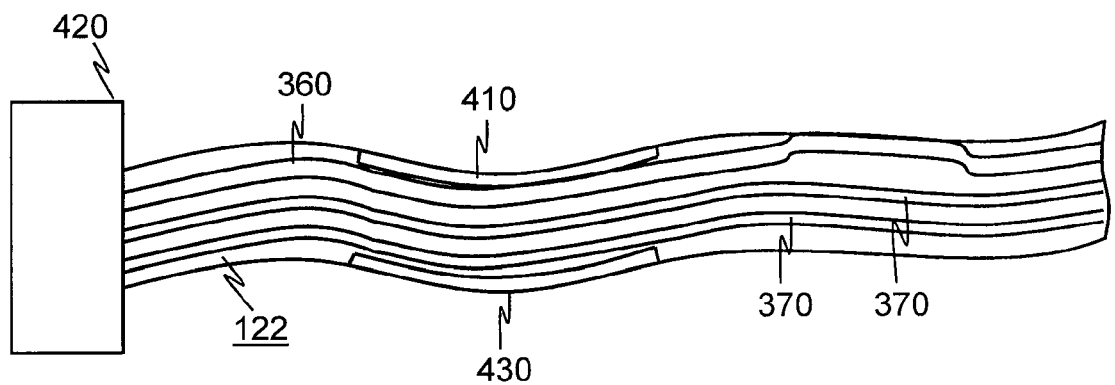
FIG. 4 shows as enlarged view some details of a cable according to an example embodiment.

FIG. 4 shows as enlarged view some details of the cable 122. In this example embodiment, no microphone 124 is shown (there is none, the microphone is concealed in the cable or the microphone locates at a headphone 128). At one manipulation section 123, there is a transparent cover layer 410 that lets light appear from an optical wire 360. At another manipulation section 123, an optical wire 360 runs on a surface of the cable 122. A connector 420 enables connecting of the cable 122 to a host device.

The connector 420 has an illumination control port 422 for receiving control and/or supply signals (electric or optical) for controlling and/or driving illumination at the cable 122.

In addition or instead of using optical wires 360, the cable 122 comprises in one example embodiments an illumination element 430 that is formed of one or more electric illumination elements such as light emitting diodes. Flexible light guide arrangements can also be produced. For instance, a number of sequential rigid transparent light guide parts can be used to produce a suitably light scattering light guide, or flexible transparent plastics can be used to implement the light guide arrangement.

In one example embodiment, the hands-free set 120 also accommodates the detector circuitry 330 for detecting mechanical manipulation of the cable 122. The detector circuitry 330 can be located in the cable, optionally in a dedicated housing. The detector circuitry 330 can also be housed by another housing such as a housing of a headphone 128, of the microphone 124 or of the connector 420. If the detector circuitry 330 is comprised by the hands-free set 120, the detector circuitry 330 should have a local power source such as a battery, or the detector circuitry should obtain its operating power from the cable 122. In the latter case, the host device can supply DC voltage through the connector 420.

To inhibit accidentally producing control instructions, the hands-free set 120 of FIG. 4 is further drawn to comprise a capacitive sensing strip 440 along its surface at the manipulation sections 123. Thus, if the wire of the hands-free set 120 is bent e.g. by normal body movements of the user 110, there is no capacitive sensing of the user's 110 touch (no connection to the skin of the user 110) at the manipulation sections 123 and possible mechanical manipulation is either not detected at all, or if any mechanical manipulation is detected, the detection is simply neglected. Depending on the power consumption of the mechanical manipulation detection and the capacitive sensing, in some embodiments the mechanical manipulation detection is carried out only in the presence of a positive capacitive sensing of user's 110 touch for saving power and/or reducing computational cost if a common processor is used both for the mechanical manipulation detection and other purposes. The capacitive sensing itself is performed by a capacitive sensing circuitry that is a dedicated circuitry or a circuitry combined with some other circuitry such as the detector circuitry 330. In FIG. 4, the capacitive sensing circuitry is combined with the detector circuitry 330.

In the foregoing, it is described how a hands-free set can be controlled to enable detection of mechanical manipulation by a detector 430 comprised by either a host device 110 or its wired accessory such as the hands-free set 120. In FIG. 1, the host device of FIG. 1 is a telecommunication device 110. Other types of host devices can also benefit of the present invention. For instance, the host device may be a general computer, music player or any other device that has a cable, regardless whether any other devices such as accessories are connectable to the host device. A bedside lamp or desk lamp, for instance, can be switched on/off or dimmed/undimmed by mechanical manipulating of a power cable thereof. On the other hand, the host device may work with a wired accessory such as the hands-free set 120, computer mouse, game controller or microphone.

In addition to the aforementioned two cases of having the detector in the host device or its wired accessory, there is a further example embodiment, in which the detector 430 is provided by another apparatus such as an adapter that can interconnect an accessory device to a host device. For instance, such an adapter may comprise:

at least one memory comprising instructions;

at least one processor configured to control operations of the apparatus according to said instructions;

a detector circuitry;

a cable port configured to operatively connect a cable comprising one or more electric or optical wires to the detector circuitry and to exchange electricity and/or information signals through the cable;

a host device port configured to operatively connect the apparatus to a host device for exchanging signals between the cable and the host device;

wherein the detector circuitry is configured to detect mechanical manipulation of the cable by a user; and the processor being further configured, responsive to detecting of mechanical manipulation of the cable, to produce corresponding control signals and to output the control signals by the host device port to enable the user to control the host device by mechanical manipulation of the cable.

Without in any way limiting the scope, interpretation, or application of the claims appearing below, a technical effect of one or more of the example embodiments disclosed herein is that a user may be enabled to control operation of a device by mechanically manipulating its accessory cable with his or her fingers, for instance. Another technical effect of one or more of the example embodiments disclosed herein is that illumination can be provided by the cable as feedback of the user's control commands issued by mechanical manipulation of the cable. Another technical effect of one or more of the example embodiments disclosed herein is that visual effects can be provided by the cable indicative of the state of a connected host device, or of the signals that pass through the cable. The visual effects may be used even for distinguishing a caller of a telephone call by allowing the user to associate different visual effects with different callers. Another technical effect of one or more of the example embodiments disclosed herein is that control of an apparatus by mechanical manipulating its cable may be applicable to hazardous environments where transitional keys or control clusters are not suited (for explosion risks, for example). Another technical effect of one or more of the example embodiments disclosed herein is that control of an apparatus by mechanically manipulating its cable may enable very efficient and weather robust method of controlling operation of devices that have long power supply cables (e.g. cables longer than 5, 10 or 20 meters). For instance, the apparatus may reside at a power plug of a long extension cord and enable switching power on and off from an extension cable without gaining access to the plug, particularly useful e.g. at construction sites and other venues where temporary power supply is needed.

As an example of the use of a computer mouse as the accessory, the mouse cable can be bent triggered to activate functions such as scrolling or zooming on a computer to which the mouse is connected.

Embodiments of the present invention may be implemented in software, hardware, application logic or a combination of software, hardware and application logic. In the foregoing description, reference was made simply to instructions with a meaning of computer executable program code or logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIG. 3. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:

detecting mechanical manipulation of a cable by a user sequentially at different positions along a length of the cable;

detecting whether a given succession of mechanical manipulations of the cable at different positions along the length of the cable has occurred;

detecting a command from the detected given succession of mechanical manipulations of the cable; and responsive to the detecting of the command, causing corresponding controlling operation of an apparatus that is in operational connection with the cable to enable the user to control the apparatus by the command.

2. The method of claim 1, wherein the mechanical manipulation comprises bending the cable.

3. The method of claim 1, wherein the mechanical manipulation comprises squeezing the cable.

4. The method of claim 1, further comprising detecting extent of the mechanical manipulation of the cable.

5. The method of claim 1, further comprising producing a control signal indicative of a user command in response to the detecting of the command, the control signal corresponding to location of the mechanical manipulation of the cable.

6. The method of claim 1, further comprising providing illumination by a given proportion of the length of the cable.

7. The method of claim 6, wherein the providing of the illumination comprises providing illumination with variable colors.

8. The method of claim 7, wherein the providing of the illumination produces one or more visually different parts in the cable along the length thereof corresponding to different operations available to the user by mechanical manipulation of the cable.

9. An apparatus comprising:
at least one memory comprising instructions;
at least one processor configured to control operations of the apparatus according to said instructions;
a detector circuitry; and
a port configured to operatively connect a cable to the detector circuitry;
wherein the detector circuitry is configured to detect mechanical manipulation of the cable by a user sequentially at different positions along a length of the cable and is further configured to detect whether a given succession of mechanical manipulations of the cable at different positions along the length of the cable has occurred and to detect a command from the detected given succession of mechanical manipulations of the cable; and
the processor being further configured, responsive to the detecting of the command, to cause a corresponding controlling operation of the apparatus to enable the user to control the apparatus by the command.

10. The apparatus of claim 9, wherein the mechanical manipulation comprises bending the cable.

11. The apparatus of claim 9, wherein the mechanical manipulation comprises squeezing the cable.

12. The apparatus of claim 9, wherein the detector circuitry is further configured to detect extent of the mechanical manipulation of the cable.

13. The apparatus of claim 9, the detector circuitry is further configured to produce a control signal indicative of a user command in response to the detecting of the command.

14. The apparatus of claim 13, wherein the control signal is indicative of the location of the mechanical manipulation of the cable.

15. The apparatus of claim 9, the detector circuitry is further configured to detect location of the mechanical manipulation of the cable.

16. The apparatus of claim 9, further comprising an illumination controller configured to control an illumination element in the cable to provide controlled illumination.

17. The apparatus of claim 16, wherein the controlled illumination comprises illumination with variable colors.

18. The apparatus of claim 16, wherein the illumination controller is configured to cause the illumination element to produce one or more visually different parts in the cable along the length of the cable corresponding to different operations available to the user by mechanical manipulation of the cable.

19. The apparatus of claim 9, further comprising a capacitive touch sensing circuitry configured to inhibit producing of control signals when the mechanical manipulation of the cable is not caused by the user's skin.

20. An apparatus comprising:
at least one memory comprising instructions;
at least one processor configured to control operations of the apparatus according to said instructions;
a detector circuitry;
a cable port configured to operatively connect a cable the detector circuitry; and
a host device port configured to operatively connect the apparatus to a host device for exchanging power or information signals between the cable and the host device;
wherein the detector circuitry is configured to detect mechanical manipulation of the cable by a user sequentially at different positions along a length of the cable and is further configured to detect whether a given succession of mechanical manipulations of the cable at different positions along the length of the cable has occurred and to detect a command from the detected given succession of mechanical manipulations of the cable; and
the processor being further configured, responsive to the detecting of the command, to produce corresponding control signals and to output the control signals by the host device port to enable the user to control the host device by the command.

* * * * *